INVENTORS
SEYMOUR B. ALPERT
RONALD H. WOLK
MICHAEL C. CHERVENAK
BY Nathaniel Ely
ATTORNEY

United States Patent Office

3,681,231
Patented Aug. 1, 1972

3,681,231
HIGHER CONVERSION HYDROGENATION
Seymour B. Alpert, Princeton, Ronald H. Wolk, Trenton, and Michael C. Chervenak, Pennington, N.J., assignors to Hydrocarbon Research, Inc., New York, N.Y.
Continuation of abandoned application Ser. No. 808,510, Mar. 19, 1969. This application Feb. 10, 1971, Ser. No. 114,343
Int. Cl. C10g 9/16, 13/02, 37/04; C23f 14/00
U.S. Cl. 208—59                               5 Claims

ABSTRACT OF THE DISCLOSURE

A process for the hydrogenation of a petroleum residuum feed material containing at least 25 volume percent material boiling above 975° F. and greater than 5 weight percent asphaltenes by reacting the feed with a hydrogen rich gas at elevated temperatures and pressures in an ebullated catalytic bed reactor wherein said feed material is blended with an aromatic diluent having a gravity of less than 16° API, a Watson characterization factor of less than 11.2 and a boiling point within the range of from about 700° F. to about 1000° F., prior to hydrogenation.

---

This application is a continuation of Ser. No. 808,510, filed Mar. 19, 1969, and now abandoned.

BACKGROUND OF THE INVENTION

(1) Field of the invention

This invention relates to improvements in the method of converting residual petroleum fractions to lower boiling materials. It specifically concerns itself with maintaining an operable system at higher levels of conversion of charge stock boiling above 975° F., i.e., 975° F.+, than have been possible heretofore.

(2) Description of the prior art

When converting a residuum by destructive hydrogenation, the primary objective is to obtain as high a level of conversion of the residuum as is compatible with an operable system. The ultimate goal is, of course, to convert all of the charge stock boiling above 975° F. to lower boiling material such as gasoline, kerosene, jet fuel, diesel oil and heavy gas oil with the complete elimination of low grade, higher boiling liquids.

It is understood that when converting a residuum by destructive hydrogenation under the necessary high temperature and pressure conditions, many reactions take place including saturation, polymerization, cracking, desulfurization, denitrogenation, hydrogenation and similar reactions which all proceed simultaneously although usually at different rates. The results, then, are basically empirical and are functions of feedstock characteristics, temperature, pressure, space velocity, hydrogen rate, catalyst type, and catalyst activity.

The catalytic hydrogenation of residuum is well known and in the patent of Johanson, U.S. Re. 25,770, a process is disclosed wherein the reaction is accomplished in the liquid phase with the heated residuum and hydrogen passing upwardly through a bed of catalyst at such a rate as to force the particles into random motion. The majority of the liquid passing through the bed can be recycled from a point above the top of the catalyst bed back through the inlet at the bottom.

One of the unique features of such a system is that operating conditions are controlled so as to eliminate any substantial carryover of catalyst from the reaction zone. The most beneficial feature of this type of operation is that the reaction zone is maintained at substantially isothermal conditions. It is, therefore, possible to utilize a higher average temperature; and because of the avoidance of high local temperatures, the catalyst ends to remain clean for a long period of time. In addition, due to the upward flow of the reactants and the expansion of the bed, any coke that might be formed is passed through the bed without difficulty, and the total pressure drop across the bed does not change.

Difficulty has been encountered, however, in the treatment of feedstocks containing high percentages of metal and asphaltenes with regard to operability of the system at high conversion levels. The precipitation and agglomeration of the asphaltenes on the catalyst and on the internal reactor and conduit surfaces eventually results in severe reactor coking, necessitating shutdown of the system after relatively short operating periods. As disclosed in U.S. Pat. No. 3,412,010, a substantial improvement in operability of such feeds can be obtained by recycle of a 680°–975° F. gas oil resulting from the processing of the feed. However, with feedstocks having very high asphaltene contents, i.e., more than 5 weight percent pentane insolubles, such recycle does not necessarily have the proper character to improve the operability of the system and special diluents are required to either supplement or totally replace the self derived oils.

SUMMARY OF THE INVENTION

We have discovered a process whereby substantial improvement in operability can be obtained in the high conversion hydrocracking of high asphaltene content petroleum residuums and crudes. More particularly, we have found that in the hydroconversion of residuum and crude feedstocks having at least 25 volume percent boiling above 975° F., and containing greater than 5 weight percent asphaltenes in an ebullated catalytic bed system, improved operability and increased on-stream times are obtained by blending the feed with a hydrocarbon diluent in a ratio of at least about 20 to about 70 volume percent diluent based on feed, said diluent having a gravity of less than 16° API, a Watson characterization factor of less than 11.2 and a boiling point in the range of from about 700° F. to about 1000° F., and then subjecting the blended feed to the catalytic hydroconversion treatment.

DESCRIPTION OF THE PREFERRED EMBODIMENTS

Figure 1:
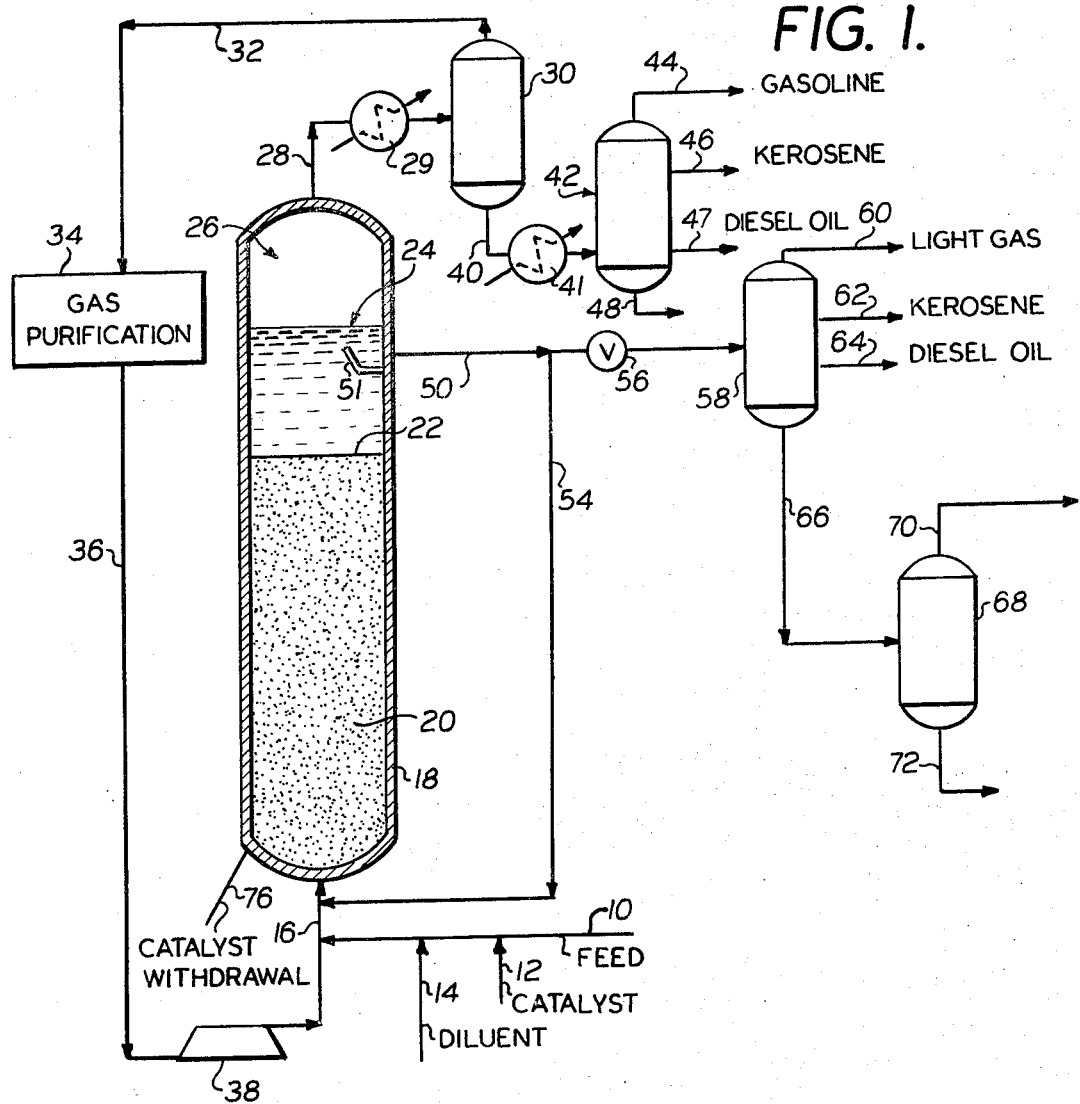
FIG. 1 is a schematic view of a hydrogenation process for the conversion of hydrocarbon feeds.

In a preferred mode of carrying out the present invention, illustrated in FIG. 1, a feed in line 10 is mixed with a catalyst in line 12 and blended with a diluent in line 14. The blend is in the form of a slurry and is mixed with hydrogen in line 16 and fed through line 16 into a reactor 18. As taught in the Johanson patent referred to above, the reactor contains a bed of a particulate catalyst 20. By virtue of the gas and liquid flowing upwardly through the reactor, the catalyst bed is expanded and the particles are in random motion.

Feed materials containing greater than 5 weight percent asphaltenes, on which our process would normally be used, include residuum such as petroleum atmospheric and/or vacuum distillation bottoms, deasphalter bottoms, shale oil, shale oil residues, tar sands, bitumen, and coal-derived hydrocarbon and hydrocarbon residues.

Conditions generally used for such processes include temperatures within the range of from about 600° F. to about 900° F., pressures in the range of from about 500 to about 5000 p.s.i.g., hydrogen partial pressures in the range of from about 65 percent to about 95 percent of the total pressure, space velocities in the range of from about 0.2 to about 5.0 $V_f/hr./V_r$, (volume of feed per hour per volume of reactor) and hydrogen circulation rates in the range of from about 1000 to about 10,000 s.c.f./bbl.

The diluent used in our invention generally comprises a hydrocarbon oil having a boiling point in the range of from about 700° F. to about 1000° F., a gravity of less than 16° API and a Watson characterization factor of less than 11.2. Such diluents include decant oils from fluid catalytic cracking processes, syntower bottoms from Thermofor catalytic cracking operations, heavy coker gas oils, cycle oils from cracking operations, and anthracene oil obtained from the destructive distillation of coal. In certain cases, the 700–1000° F. gas oil generated in the process will fall within this range of gravity and characterization factor and can serve as the diluent.

Generally, we have found that for the high asphaltene containing feeds described above, the amount of diluent required for successful operation is within the range from about 20 volume percent to about 70 volume percent of the feed, with the preferred range being from about 20 volume percent to about 40 volume percent of the feed.

The catalysts employed are of the type normally used in hydroconversion processes. Generally, these comprise alumina alone or combinations of silica and alumina alone, or either of the foregoing base catalysts activated with metals, or oxides of metals, such as Cr, Mo, W, Mn, Fe, Co, Ni, Pd or Pt. Particularly useful catalysts include cobalt molybdate on alumina, nickel molybdate on alumina and nickel molybdate on silica-alumina.

The catalyst particle size range is preferably narrow so as to better affect uniform expansion under controlled liquid and gas flow conditions. Generally, the process may incorporate a relatively "large size" catalyst, normally, in the form of extrudates having diameters from about 1/32 inch to 1/8 inch. When this size catalyst is used, a heavy oil recycle, either external or internal to the reactor is required in order to maintain the ebullated state or random motion of the particles. We have found that the operable liquid flow velocity range for the "large" catalyst is between about 10 to about 100 gallons of total liquid per minute per square foot of horizontal reactor space. The preferable liquid velocity in this system is from about 40 to about 60 gallons of total liquid per minute per square foot of horizontal reactor space.

An alternate process which we have used, is a "fine" catalyst system, incorporating catalyst having a narrow size distribution in the range of from about 40 to about 325 mesh (U.S. Std.). With the "fine" catalyst system, the liquid velocity required to maintain proper expansion of the bed is usually below 10 gallons per gallons per minute of total liquid per square foot of horizontal reactor space, the liquid velocity preferably being between about 0.5 to about 8.0 gallons per minute of total liquid per square foot of horizontal reactor space. In the "fine" catalyst system therefore, it is unnecessary to use recycle to maintain an "ebullated" bed. Recycle of desired fractions may, of course, be used to control product distribution and catalyst may be withdrawn from reactor 18 through line 76.

By control of the catalyst particles size and density and liquid and gas velocities and taking into account the viscosity of the liquid and the lifting effect of the hydrogen under the operating conditions, the catalyst bed may be expanded to have a definite level or interface indicated at 22 in the liquid. It will be apparent that the settled level of the catalyst, as when the liquid rate drops below a catalyst sustaining value, will be considerably lower than level 22. Normally, bed expansion should be at least 10 percent and seldom over 300 percent of the static level.

In a reactor system of this type, we provide a vapor space 26 above liquid level 24, from which a vapor overhead, completely free of liquid, is removed in line 28. This may be conveniently cooled and partially condensed in heat exchanger 29 and separated in separator 30 into a gaseous portion removed overhead in line 32, and a liquid portion removed in line 40. The gaseous portion in line 32 which is largely hydrogen, may be purified by conventional means 34 and after being reheated, can be recycled through compressor 38 to the feed line 16.

The liquid portion in line 40 from separator 30 is cooled in heat exchanger 41 and then fractionated in distillation column 42 into fractions boiling in the gasoline range in line 44, kerosene in line 46 and diesel oil in line 47, and a heavy gas oil with a boiling range between about 680° F. to about 975° F. in line 48.

A heavy liquid effluent from the reaction zone and substantially free of catalyst is recovered from the liquid in the upper part of reactor 18 by trap tray 51, such liquid in line 50 passing through pressure reducing valve 56 and being fractionated without cooling in atmospheric distillation column 58. Preferably, light products such as light gas are removed overhead in line 60, and kerosene and diesel oil boiling range materials are removed as side streams in lines 62 and 64 respectively. A fuel oil fraction is removed in line 66 as bottoms.

Design and operation of the vapor section 26 of the reactor is critical to the successful operation of the entire plant in that the vapor stream must be free of droplets or mist, for the high concentration of asphaltenic materials present in these liquid droplets will be completely precipitated by the paraffinic naphtha that is present when all of the condensible materials in this stream are in the liquid form. This would, of course, result in fouling of all exchanger surfaces, pipe surfaces, valves and vessels walls.

The fuel oil fraction in line 66, which for the most part boils above 680° F., is passed to a vacuum still 68 and fractionated into a heavy gas oil boiling in the range 680°–975° F. removed in line 70 and a bottoms material boiling above 975° F., which is removed in line 72.

A portion of the liquid effluent in line 50 may be recycled directly to the reactor through line 54 in order to assure completeness of the reaction and to establish a sufficient upflow liquid velocity to assist in maintaining the catalyst in random motion in the liquid as described heretofore.

Numerous modifications of this system may be used depending on the nature of the feed. Thus, more than one ebullated reaction stage either in series or parallel may be utilized. We have found it to be advantageous when using multiple reaction stages in series to remove the vaporous products from each reaction zone except the last and pass only the liquid effluent on to the next stage.

The following examples serve to further illustrate our invention:

The Watson characterization factors given herein were determined from the following formula:

$$K = \frac{\sqrt[3]{\text{Molal Average Boiling Point, } °F. + 460}}{\text{Specific gravity at } 60° F.}$$

In each case, the boiling point at the 50 percent volume distillation point was used as an approximation for the molal average boiling point.

EXAMPLE 1

Example 1 illustrates the improvement that can be obtained in a hydrogenation conversion process on a high asphaltene content feed when an aromatic diluent is blended with the feed prior to processing. As shown, in Table I Run 1 at a relatively low conversion, the unit had to shut down due to severe coking and inoperability. When the identical feed with diluent added was processed, even at higher temperature conditions, the process ran smoothly without shutdown due to coking (Run 2). When the reactor finally was shut down, inspection showed it to be substantially free of solid carbonaceous materials.

TABLE I

| Run number | 1 | 2 |
|---|---|---|
| Conditions: | | |
| Temperature, °F | 810 | 825 |
| Space velocity, $V_f/hr./V_r$: | | |
| Feed | 0.5 | 0.5 |
| Diluent | | 0.12 |
| Amount of diluent, vol. percent feed | 0 | 20 |
| Conversion of 975° F.+, wt. percent | 56 | 70 |
| Condition of Unit on shutdown | Coked | (¹) |

¹ Voluntary shutdown, clear reactor.

Feed and Diluent Inspection (Vacuum residuum)

| | Feed | Diluent |
|---|---|---|
| Gravity, API° | 5.6 | −2.7 |
| Sulfur, wt. percent | 3.48 | 1.75 |
| R.C.R., wt. percent | 18.3 | |
| Ramsbottom carbon residue: | | |
| Asphaltenes, wt. percent | 17 | |
| Watson factor | | 10.5 |
| Distillation (vol. percent distilled over): | | |
| At 650° F | | 5.0 |
| At 975° F | 0 | 90. |
| Metals, p.p.m.: | | |
| Vanadium | 590 | 0.68 |
| Nickel | 74 | 3.2 | desired conversion, the system using the aromatic diluent remained highly operable.

TABLE II

| Run number | 3 | 4 |
|---|---|---|
| Conditions: | | |
| Temperature, °F | 835 | 840 |
| Pressure, p.s.i.g | 2,250 | 2,250 |
| Space velocity, $V_f/hr./V_r$ | 0.8 | 0.3 |
| Amount of diluent, vol. percent feed | 37.5 | 56.5 |
| Conversion, 975° F.+, wt. percent | 55 | 57 |
| Onstream time, hrs | 75 | 1,100 |

| Fraction | Total | IBP–975° F. | 975° F.+ |
|---|---|---|---|
| Feed inspection: | | | |
| Volume percent | 100.0 | 11.5 | 88.5 |
| Gravity, °API | 5.4 | 14.7 | 3.5 |
| Sulfur, wt. percent | 3.76 | 3.05 | 3.82 |
| Ramsbottom carbon residue, wt. percent | 24.3 | | |
| H/C atomic ratio | 1.34 | | |
| Carbon, wt. percent | 85.45 | | |
| Hydrogen, wt. percent | 9.59 | | |
| Nitrogen, p.p.m | 4,900 | | |
| Asphaltenes, wt. percent | 22.2 | | |
| Benzene extraction: | | | |
| Sediment, wt. percent | 0.007 | | |
| Coke, wt. percent | 0.007 | | |
| Metals: | | | |
| Nickel, p.p.m | 46 | | |
| Vanadium, p.p.m | 206 | | |
| ASTM ash, wt. percent | 0.008 | | |
| Viscosity, SFS at 210° F | 1,287.0 | | |

| | Total | IBP–750° F. | 750–850° F. | 850° F.+ |
|---|---|---|---|---|
| Diluent inspection: | | | | |
| Vol. percent | 100 | 36.0 | 25.0 | 39.0 |
| Gravity, °API | 12.0 | 16.6 | 11.5 | 8.4 |
| Sulfur, wt. percent | 1.16 | 0.68 | 0.95 | 1.58 |
| Carbon, wt. percent | 87.33 | | | |
| Hydrogen, wt. percent | 10.11 | | | |
| H/C atomic ratio | 1.39 | | | |

| ASTM distillation: | |
|---|---|
| IBP | 445° F. |
| 5 | 556° F. |
| 10 | 667° F. |
| 20 | 701° F. |
| 30 | 721° F. |
| 40 | 740° F. |
| 50 | 784° F. |
| 60 | 810° F. |
| 70 | 843° F. |
| 80 | 905° F. |
| 90 | 948° F. |
| 95 | 1,003° F. |
| EP | 1,043° F. |
| Watson factor (K) | 10.9 |

EXAMPLE 2

Example 2 illustrates the improvement in operability that can be obtained by increasing the amount of a highly aromatic diluent blended with the feed. As shown in Table II, Run 4 with 56.5 volume percent diluent was completely operable and ran for 1100 hours on-stream without any difficulty. Voluntary shut down and inspection at that time showed the reactor to be free of coke. Run 3, on the other hand, with only 37.5 volume percent diluent was shut down out of necessity after 75 hours of on-stream time due to a coked reactor. It is additionally noted that Run 4 was operated at a substantially higher severity level, i.e., space velocity of 0.3, compared to Run 3, i.e., space velocity of 0.8. Thus, even at the increased severity levels required in order to obtain the

EXAMPLE 3

Example 3 illustrates the effect of increased aromatic diluent content on the operability of a two-stage hydroconversion process. The particular system used for this process consisted of two ebullated bed hydrogenation reactors in series with the liquid and vaporous products from the first reaction zone being separated between stages and only the liquid effluent being passed to the second stage reactor. The feed was a blend of three separate components, the description of each being given in Table IV. As can be seen from Table III (Run 6), wherein the feed contained only 20 volume percent of the aromatic diluent, the unit had to be shut down due to the coking after 75 hours of on-stream time. When, however, the diluent content of the feed was increased to 40 volume percent (Run 5), the on-stream time was 175 hours, with no operating difficulties encountered during this period.

TABLE III

| Run number | 5 | 6 |
|---|---|---|
| Operating conditions: | | |
| First stage: | | |
| Hydrogen pressure, p.s.i.g | 2,270 | 2,300 |
| Temperature, °F | 830–837 | 830–836 |
| Space velocity, $V_f/hr./V_r$ | 1.3 | 1.6 |
| Hydrogen rate, s.c.f./bbl | 5,500 | 5,500 |
| Second stage: | | |
| Hydrogen pressure | 2,270 | 2,300 |
| Temperature, °F | 830–837 | 830–836 |
| Space velocity, $V_f/hr./V_r$ | 1.3 | 1.5–1.6 |
| Hydrogen rate, s.c.f./bbl | 5,500 | 5,500 |
| Overall space velocity, $V_f/hr./V_r$ | 0.65 | |
| Overall conversion of 975° F.+, wt. percent | 62–64 | 55–60 |
| Time on-stream, hrs | 175 | 75 |
| H.S. & W. (total liquid product), vol. percent | 10–15 | 30 |
| Feed blend: | | |
| Vol. percent diluent | 40 | 20 |
| Vol. percent asphalt | 30 | 40 |
| Vol. percent vacuum residuum | 30 | 40 |
| Wt. percent asphaltenes | 20 | 22 |

TABLE IV

| | Diluent | Asphalt | Vacuum residuum |
|---|---|---|---|
| Gravity, °API | 1.2 | −0.2 | 6.8 |
| Sulfur, wt. percent | 1.88 | 2.36 | 4.46 |
| Benzene insoluble, wt. percent | | 0.20 | 0.19 |
| Watson factor | 10.5 | | |
| Inorganic insolubles, wt. percent | | 0.06 | 0.11 |
| ASTM ash, wt. percent | 0.077 | 0.11 | 0.7$_6$ |

| Distillation, percent: | |
|---|---|
| IBP | 572° F. |
| 10 | 714° F. |
| 30 | 778° F. |
| 50 | 815° F. |
| 90 | 962° F. |
| FBP | 1,015° F. |
| Ramsbottom carbon, wt. percent | 8.9. |

EXAMPLE 4

Example 4 illustrates the improvement obtained with our process over an identical process using either no diluent or a non-aromatic gas oil diluent. Runs 7, 8 and 9 were carried out in a fixed bed catalytic reactor. In Runs 7 and 8, the reaction had to be terminated due to reactor coking. Run 9, however, was shut down voluntarily and subsequent inspection showed that the reactor was clean.

TABLE V

| Run number | 7 | 8 | 9 |
|---|---|---|---|
| Conditions (fixed bed): | | | |
| Pressure, p.s.i.g | 2,250 | 2,250 | 2,250. |
| Temperature, °F | 810 | 810 | 810. |
| Space velocity, $V_f/hr./V_r$ | 0.5 | 0.5 | 0.5. |
| Type diluent, vol. percent feed | None | Gas oil | Anthracene oil. |
| Amount of diluent, vol. percent feed | | 50 | 50. |
| Diluent inspection: | | | |
| Boiling range, °F | | 650–1,000 | 500–850. |
| Gravity, °API | | 21.7 | −8.2. |
| Watson factor | | 12.1 | 9.8. |
| Feed inspection: | | | |
| Gravity, °API | 10.5 | 10.5 | 10.5. |
| Sulfur, wt. percent | 1.4 | 1.4 | 1.4. |
| Asphaltenes, wt. percent | 17.1 | 17.1 | 17.1. |
| Reactor at shut down | Coked | Coked | Clean. |

EXAMPLE 5

Figure 2:
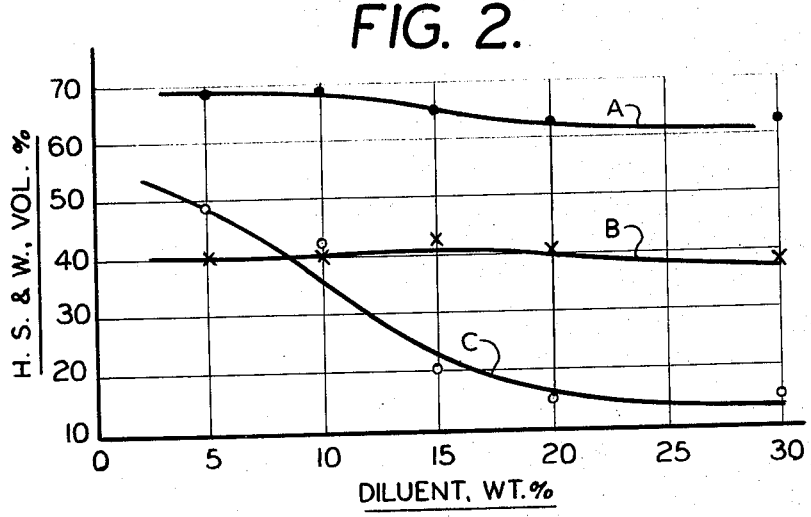
FIG. 2 is a graph of change in H.S. & W. values with diluent concentration for several diluent materials.

Example 5 illustrates the effect of an aromatic diluent as compared to a non-aromatic diluent on H.S. & W. values. 50 cc. of normal heptane were placed in a calibrated centrifuge flask and 50 cc. of sample were added. The sample was composed of a typical residuum product material with varying concentrations of aromatic and non-aromatic diluents. The flask was stoppered, the contents mixed well and the mixture was then centrifuged for 30 minutes. The volume of insolubles in the bottom of the flask was measured and multiplied by 2 to give the H.S. & W. value. The characterization of the feed and diluents used are shown in Table VI, and the results of the analyses are shown in FIG. 2.

TABLE VI

| | Product | Diluents | | |
| | | Vacuum overhead (A) | Lube stock (B) | Dicant oil (C) |
|---|---|---|---|---|
| Gravity, °API | 10.6 | 20.8 | 17.0 | −1.0 |
| Boiling range, °F | | 700–1,000 | 800–1,000 | 700–1,000 |
| Sulfur, wt. percent | 1.36 | 1.0 | 1.24 | 1.83 |
| Watson factor | | 11.7 | 11.7 | 10.3 |
| H.S. & W. | 70 | | | |

Generally, the amount of heptane insolubles in a product fraction correlate highly with the operability of the system at given conditions.

Specifically we have found, by measurements on reactor liquid products, that H.S. & W. values less than 30 are indicative of an operable condition, while values above 50 are obtained with inoperable systems. Values from about 30 to about 50 indicate difficulty in operation although the results vary with feedstocks.

The H.S. & W. measurement may be made on either the reactor liquid product or the hot separator liquid product. In the former case, the separation of gas (including condensible vapors) and liquid products is made in the reactor, while in the latter case, the separation is made in an external separator at reaction pressure, but at temperatures about 100° F. to about 300° F. lower than reactor temperature.

As can be seen from FIG. 2, vacuum overhead (A) and lube stock (B) give essentially no improvement in H.S. & W. value with increasing concentration of the diluent. The highly aromatic (low °API) decant oil, however, produces a marked decrease in H.S. & W., particularly as the diluent concentration goes above 15 weight percent. Above this level, the H.S. & W. values are clearly within the operable range.

Variations can, of course, be made without departing from the spirit and scope of our invention.

We claim:

1. The improved process of hydrogenating and hydrocracking a petroleum residuum feed material having at least 25 volume percent boiling above 975° F., and containing greater than 5 weight percent asphaltenes wherein the feed material with the hereinafter defined diluent and a hydrogenrich gas is passed upwardly through a reaction zone in the presence of a particulate hydrogenation catalyst having a narrow size distribution in the range from about ⅛ inch and 325 mesh (U.S. Std.) wherein said reaction zone is at hydrogenation conditions of temperature in the range from about 600° F. to about 900° F., a total pressure in the range from about 500 p.s.i.g. to 5000 p.s.i.g., hydrogen partial pressure in the range from about 65 percent to 95 percent of said total pressure, space velocity in the range from about 0.2 to 5.0 $V_f/hr./V_r$ and hydrogen rate within the range from about 1000 to 10,000 s.c.f./bbl., and wherein the flow velocity of liquid and gas is such as to expand the catalyst bed between about 10 percent and about 300 percent over the settled volume of said catalyst and to maintain the catalyst in random motion in the liquid and wherein a gaseous product stream free of droplets or mist is removed from the reaction zone, and wherein a liquid product stream is removed from the reaction zone, the improvement which comprises:

blending the feed with between about 20 to about 70 volume percent based on feed of an aromatic diluent having a boiling point in the range from about 700° F. to about 1000° F., a gravity below 16° API and a Watson characterization factor below 11.2.

2. The improved process of claim 1 wherein the API gravity of the diluent is in the order of −1.0, and the Watson characterization factor is in the order of 10.3.

3. The process of claim 1, wherein the amount of diluent used is within the range from about 20 to about 40 volume percent based on feed.

4. The process as claimed in claim 3, wherein the liquid products from the reaction zone have an H.S. & W. value of less than 30.

5. The process as claimed in claim 1, wherein there are two reaction zones and, wherein the blend consists of about 30 volume percent asphalt, 30 volume percent vacuum bottoms and about 40 volume percent diluent, and wherein the conditions in each reaction zone are: a temperature of about 835° F., a hydrogen partial presure of about 2250 p.s.i., a hydrogen rate of about 5500 s.c.f./bbl., and, wherein the overal space velocity of the two zones is about 0.65 $V_f/hr./V_r$ and the overall conversion of 975° F.+ boiling materials to lower boiling products is within the range from about 60 to about 65 percent by weight.

References Cited

UNITED STATES PATENTS

| | | | |
|---|---|---|---|
| 3,215,617 | 11/1965 | Burch et al. | 208—59 |
| 3,254,017 | 5/1966 | Arey et al. | 208—59 |
| 3,412,010 | 11/1968 | Alpert et al. | 208—112 |
| 3,414,505 | 12/1968 | Keith et al. | 208—108 |
| 3,499,835 | 3/1970 | Hansford | 208—111 |
| 3,549,517 | 12/1970 | Lehman et al. | 208—108 |
| 3,579,436 | 5/1971 | Mounce | 208—59 |

DELBERT E. GANTZ, Primary Examiner

G. E. SCHMITKONS, Assistant Examiner

U.S. Cl. X.R.

208—48 AA, 108, 112